United States Patent [19]
Riley et al.

[11] Patent Number: 5,636,865
[45] Date of Patent: Jun. 10, 1997

[54] INFLATOR FOR AN INFLATABLE VEHICLE OCCUPANT PROTECTION DEVICE

[75] Inventors: Michael C. Riley; Daniel D. Whalen, both of Gilbert, Ariz.

[73] Assignee: TRW Vehicle Safety Systems Inc., Lyndhurst, Ohio

[21] Appl. No.: 567,303

[22] Filed: Dec. 5, 1995

[51] Int. Cl.$^6$ .................................................. B60R 21/28
[52] U.S. Cl. ........................... 280/741; 280/728.2
[58] Field of Search ............................. 280/741, 728.2

[56] References Cited

U.S. PATENT DOCUMENTS

| | | | |
|---|---|---|---|
| 4,249,673 | 2/1981 | Katoh et al. | 280/741 |
| 5,380,039 | 1/1995 | Emery et al. | 280/741 |
| 5,382,415 | 1/1995 | Kishimoto et al. | 422/305 |
| 5,387,008 | 2/1995 | Lauritzen et al. | 280/741 |
| 5,507,520 | 4/1996 | Meduvsky et al. | 280/741 |
| 5,529,334 | 6/1996 | Meduvsky et al. | 280/738 |
| 5,531,475 | 7/1996 | Meduvsky et al. | 280/741 |

*Primary Examiner*—Kenneth R. Rice
*Attorney, Agent, or Firm*—Tarolli, Sundheim, Covell, Tummino & Szabo

[57] ABSTRACT

An inflator (10) includes a housing (12) containing a body (60) of ignitable gas generating material, an igniter (36), and a support structure (28,220) for supporting the igniter (36) in a position for igniting the body (60) of gas generating material. The inflator (10) further includes a spring (280) which biases the body (60) of gas generating material away from the support structure (28,220). The spring (280) has a part (282) which engages the support structure (220) so as to connect the spring (280) to the support structure (220) separately from the housing (12).

7 Claims, 8 Drawing Sheets

5,636,865

INFLATOR FOR AN INFLATABLE VEHICLE OCCUPANT PROTECTION DEVICE

FIELD OF THE INVENTION

The present invention relates to an inflator for an inflatable vehicle occupant protection device such as an air bag.

BACKGROUND OF THE INVENTION

An inflator for inflating a vehicle occupant protection device, such as an air bag, may contain a body of ignitable gas generating material. The gas generating material is ignited when the vehicle experiences a collision for which inflation of the air bag is desired to protect an occupant of the vehicle. As the gas generating material burns, it generates a large volume of inflation gas which is directed to flow from the inflator into the air bag to inflate the air bag. When the air bag is inflated, it extends into the vehicle occupant compartment to help protect an occupant of the vehicle from a forceful impact with parts of the vehicle.

Such an inflator commonly has an elongated cylindrical housing. A tubular structure is contained in the housing. The tubular structure defines an elongated cylindrical combustion chamber in which the body of gas generating material is contained, and includes a tubular filter. The filter cools and filters the gas as the gas flows radially outward through the filter from the combustion chamber toward the housing. A plurality of gas outlet openings extending through the housing direct the gas to flow radially outward from the inflator toward the air bag.

The body of gas generating material has approximately the same size and shape as the cylindrical combustion chamber. The body of gas generating material thus has an elongated cylindrical shape with longitudinally opposite ends adjacent to the opposite ends of the combustion chamber. Moreover, the elongated body of gas generating material is defined by a plurality of separate, shorter cylindrical grains of gas generating material.

The housing may also contain a spring at one end of the elongated body of gas generating material. Such a spring exerts a spring force axially against the elongated body of gas generating material to hold the separate grains of gas generating material together in a row extending along the length of the combustion chamber.

SUMMARY OF THE INVENTION

In accordance with the present invention, an inflator for an inflatable vehicle occupant protection device, such as an air bag, comprises a housing containing a body of ignitable gas generating material, an igniter, and support means for supporting the igniter in a position for igniting the body of gas generating material. The apparatus further comprises a spring which biases the body of gas generating material away from the support means. The spring has means for engaging the support means so as to connect the spring to the support means separately from the housing.

A spring constructed in accordance with the present invention engages the support means so as to connect itself to the support means without the need for a separate connecting structure. For example, in a first embodiment of the present invention, the spring is a coil spring compressed axially between the support means and the body of gas generating material. A first circular coil at one end of the coil spring is pressed axially against the support means. The first circular coil extends circumferentially around a cylindrical surface of the support means, and is stressed radially so as to exert a spring force radially against the cylindrical surface of the support means. The first circular coil thus establishes a tight fit between the coil spring and the support means.

In a second embodiment of the present invention, the spring is a leaf spring with an annular central portion and a plurality of spring arms extending radially outward from the central portion. The central portion of the leaf spring is received coaxially over a corresponding cylindrical surface of the support means. A plurality of barbs project radially inward from the central portion of the leaf spring, and are pressed radially inward against the cylindrical surface of the support means. The barbs engage the cylindrical surface so as to permit sliding movement of the leaf spring over the cylindrical surface in a first direction. However, the barbs block sliding movement of the leaf spring over the cylindrical surface in a second, opposite direction. In this manner, the barbs connect the leaf spring to the support means when the annular central portion of the leaf spring is moved coaxially over the cylindrical surface of the support means in the first direction.

BRIEF DESCRIPTION OF THE DRAWINGS

Further features of the present invention will become apparent to those skilled in the art to which the present invention relates from reading the following description with reference to the accompanying drawings, in which:

FIG. 12 is a schematic view of an electrical circuit including a part of the inflator of FIG. 1;

DESCRIPTION OF PREFERRED EMBODIMENTS

Figure 1:
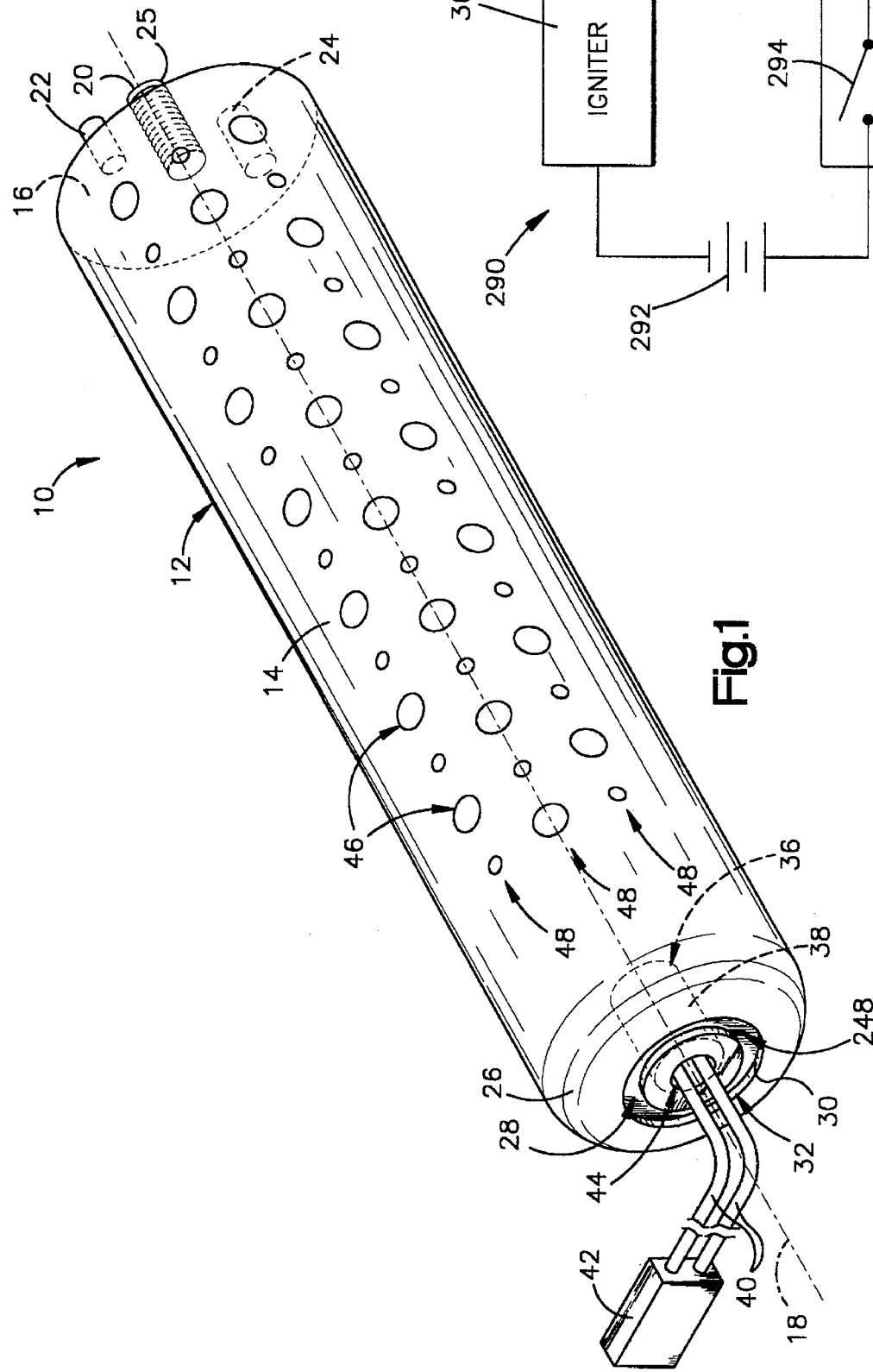
FIG. 1 is a perspective view of an inflator comprising a first embodiment of the present invention.

An inflator 10 comprising a first embodiment of the present invention is shown in FIG. 1. The inflator 10 has a cylindrical housing 12 containing a source of inflation fluid for an inflatable vehicle occupant protection device (not shown) such as an air bag. The source of inflation fluid comprises an ignitable gas generating material. When the inflator 10 is actuated, the gas generating material is ignited. The gas generating material then generates a large volume of gas for inflating the protection device.

The housing 12 has an elongated tubular body wall 14 and a circular end wall 16, each of which is centered on a longitudinal central axis 18. The end wall 16 closes one end of the tubular wall 14, and supports a plurality of mounting studs 20, 22, and 24 for mounting the inflator 10 in a reaction canister (not shown). The reaction canister is a known part which contains and supports the inflator 10 in a vehicle. The first mounting stud 20 is centered on the axis 18, and has a screw thread 25 for receiving a threaded fastener. The second and third mounting studs 22 and 24 are unthreaded, and are sized differently from each other so as to be receivable in respective alignment openings in the reaction canister. This ensures that the inflator 10 will be installed in the reaction canister in a predetermined orientation.

The opposite end of the tubular wall 14 is closed in part by an end portion 26 of the tubular wall 14, and in part by a circular closure cap 28 which is received coaxially within the tubular wall 14. The end portion 26 of the tubular wall 14 has a dome-shaped contour, and extends closely over a dome-shaped portion of the closure cap 28. The end portion 26 of the tubular wall 14 further has a annular edge surface 30 which defines a circular opening 32 centered on the axis 18. An annular elastomeric seal 34 (FIG. 2) is compressively engaged between the closure cap 28 and the end portion 26 of the tubular wall 14. The housing 12 is preferably closed and sealed in this manner in accordance with the invention set forth in copending U.S. patent application Ser. No. 08/327,281, filed Oct. 21, 1994, entitled AIR BAG INFLATOR AND METHOD OF ASSEMBLY, and assigned to TRW Vehicle Safety Systems Inc.

The inflator 10 further includes an electrically actuatable igniter 36 of known construction. As shown in FIG. 1, the igniter 36 comprises a cylindrical casing 38 and a pair of electrical lead wires 40 which extend from the casing 38. The lead wires 40 are connected to an electrical terminal 42. A pyrotechnic material is contained in the casing 38, and is ignited upon the passage of electric current through the igniter 36 between the lead wires 40. When the pyrotechnic material is ignited, it produces combustion products which rupture the casing 38 and emerge rapidly from the casing 38.

The igniter 36 is supported by the closure cap 28. The casing 38 is located coaxially within the tubular wall 14, with the lead wires 40 extending outward from the casing 38 through a circular opening 44 at the center of the closure cap 28, and further outward through the opening 32 in the tubular wall 14. The casing 38 is thus supported in a position from which it directs the combustion products into contact with the gas generating material in the housing 12 so as to ignite the gas generating material upon actuation of the igniter 36.

When the gas generating material in the housing 12 is ignited, it rapidly generates a large volume of inflation gas which emerges from the housing 12 through a plurality of outlet openings 46 in the tubular wall 14. The gas is directed from the inflator 10 to the inflatable device by the reaction canister and/or by a diffuser or manifold structure (not shown), as known in the art.

The outlet openings 46 are closely spaced from each other in parallel rows 48 which extend axially along nearly the entire length of the tubular wall 14. The rows 48 of outlet openings 46 are, in turn, closely spaced from each other in an array extending partially around the circumference of the tubular wall 14. The tubular wall 14 has a similar array of additional outlet openings (not shown) at a location diametrically opposite the location of the array of openings 46. However, unlike the openings 46, the additional openings are not intended to direct gas toward the inflatable device, but instead are intended to vent gas away from the inflatable device if the pressure of the gas exceeds a predetermined elevated level. Such additional openings are known in the art, and preferably have a total flow area substantially less than the total flow area of the openings 46.

Figure 2:
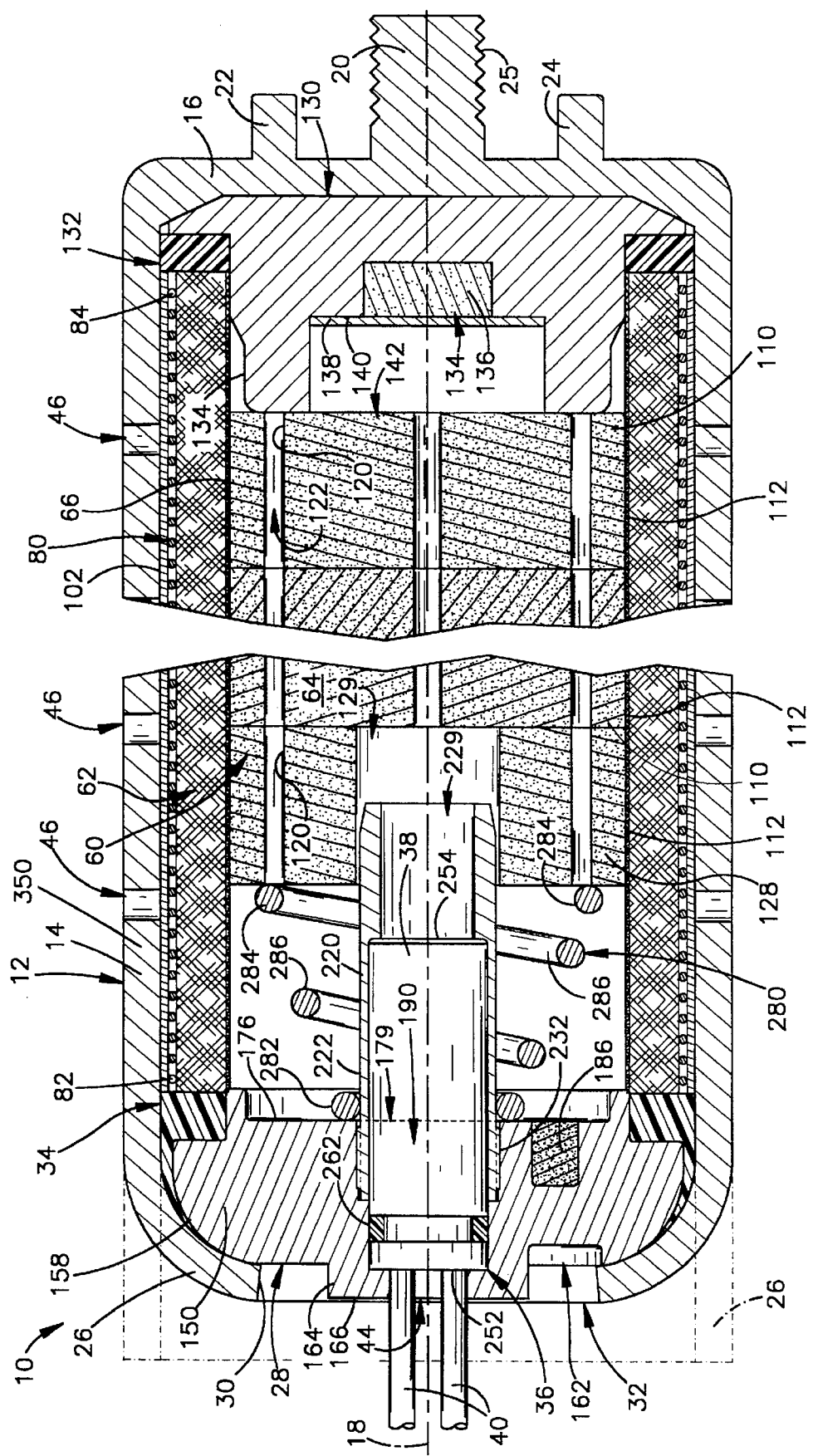
FIG. 2 is a side view, partly in section, of the inflator of FIG. 1.

As shown partially in FIG. 2, the gas generating material in the housing 12 takes the shape of an elongated cylindrical body 60. The housing 12 also contains an elongated tubular structure 62. The tubular structure 62 defines a cylindrical combustion chamber 64 in which the elongated cylindrical body 60 of gas generating material is contained.

Figure 3:
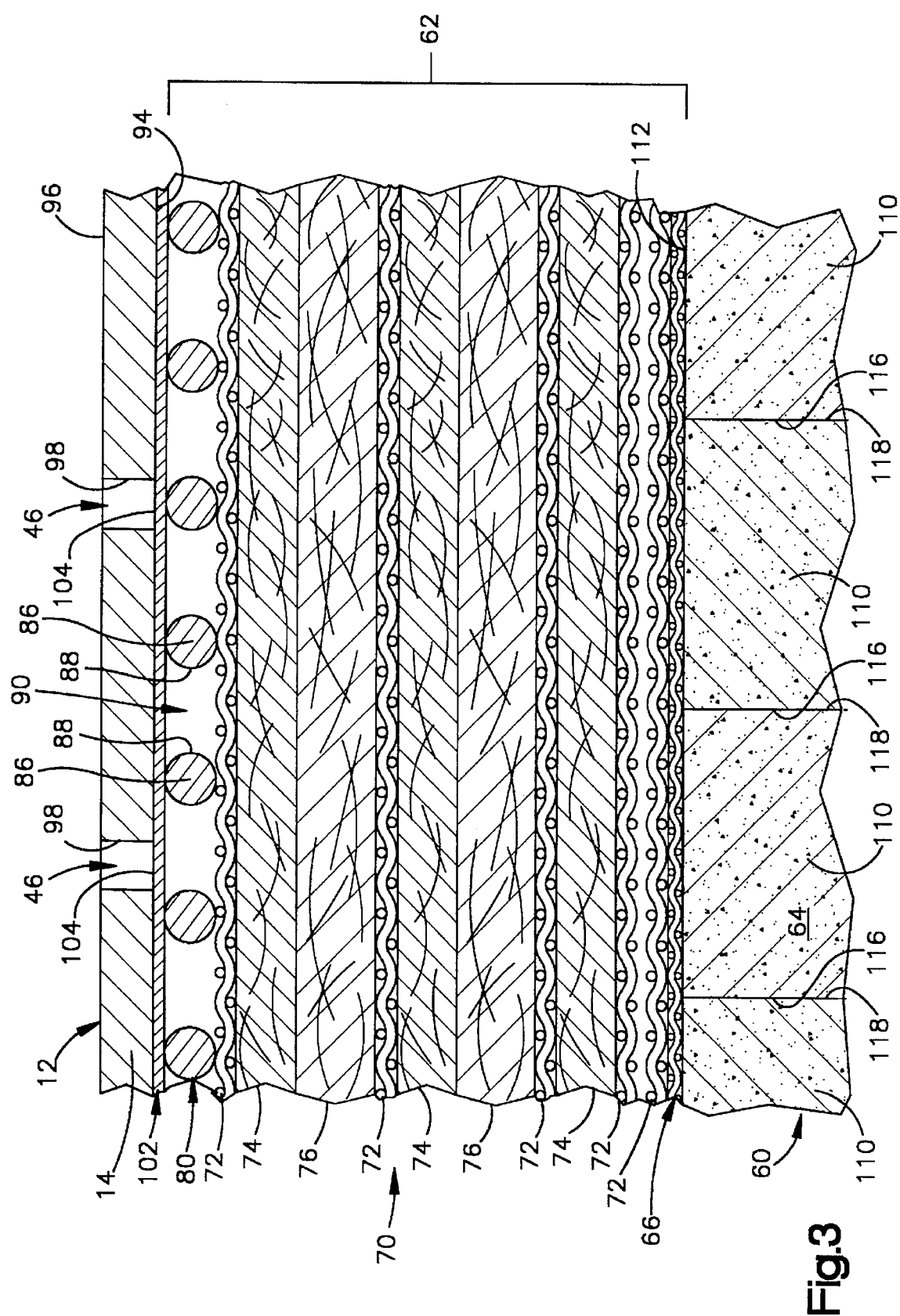
FIG. 3 is an enlarged partial view of parts shown in FIG. 2.

As shown in enlarged detail in FIG. 3, the combustion chamber 64 is defined by a cylindrical wire mesh screen 66 which defines the inner diameter of the tubular structure 62. Alternatively, the combustion chamber 64 could be defined by a perforated tubular inner body wall. Such an inner body wall could be constructed as known in the art, or as shown in copending U.S. patent application Ser. No. 08/445,652, filed May 22, 1995, entitled AIR BAG INFLATOR, and also assigned to TRW Vehicle Safety Systems Inc.

A generally cylindrical filter 70 extends circumferentially around the screen 66. The filter 70 preferably has a plurality of generally cylindrical filter layers, including layers 72 of wire mesh screen, layers 74 of steel wool, and layers 76 of ceramic/glass wool, as shown in FIG. 3. The filter 70 also could have an alternative structure as known in the art, or as shown in said copending U.S. patent application Ser. No. 08/445,652.

The tubular structure 62 further includes a support member 80. The support member 80 is a strand of metal wire which extends circumferentially and axially over the filter 70. More specifically, the support member 80 has opposite ends 82 and 84 (FIG. 2), which are fixed to the filter 70 by welds (not shown), and extends over the filter 70 in a helical configuration. A plurality of successive sections 86 (FIG. 3) of the support member 80 are shaped as helical turns extending over the filter 70 circumferentially entirely around the axis 18. The helical sections 86 have opposed helical surface portions 88 which are spaced from each other axially to define a gap 90. The gap 90 likewise extends over the filter 70 circumferentially entirely around the axis 18 in a plurality of helical turns, and is open and free of obstructions axially across it width and circumferentially along its entire length. The width of the gap 90 can be varied. However, the width of the gap 90 is preferred to be substantially greater than the widths of the openings in the underlying layers 72 of wire mesh screen in the filter 70.

The tubular wall 14 of the housing 12 has a cylindrical inner side surface 94, a cylindrical outer side surface 96, and a plurality of cylindrical inner edge surfaces 98 which define the outlet openings 46. A sheet 102 of rupturable pressure controlling material, which is preferably formed of aluminum foil, extends circumferentially around the inner side surface 94 of the tubular wall 14 in continuous contact with the inner side surface 94. The sheet 102 has a plurality of individual circular portions 104, each of which extends across the inner end of a respective one of the gas outlet openings 46.

The sheet 102 of rupturable pressure controlling material is preferably adhered to the inner side surface 94 of the tubular wall 14 of the housing 12 before the tubular structure 62 is installed in the housing 12. The tubular structure 62, which includes the filter 70, is then moved longitudinally into the housing 12 through the open end of the tubular wall 14. When the tubular structure 62 is moved into the housing 12, the support member 80 slides against the sheet 102 of rupturable pressure controlling material in helical line contact. The line contact helps prevent the outermost layer 72 of wire mesh screen in the filter 70 from tearing the sheet 102.

The elongated body 60 of gas generating material includes a plurality of separate, coaxial cylindrical bodies of gas generating material which are known as grains. The gas generating material of which the grains are formed is an ignitable material which rapidly generates a large volume of inflation gas when ignited, and may have any suitable composition known in the art.

Figure 4:
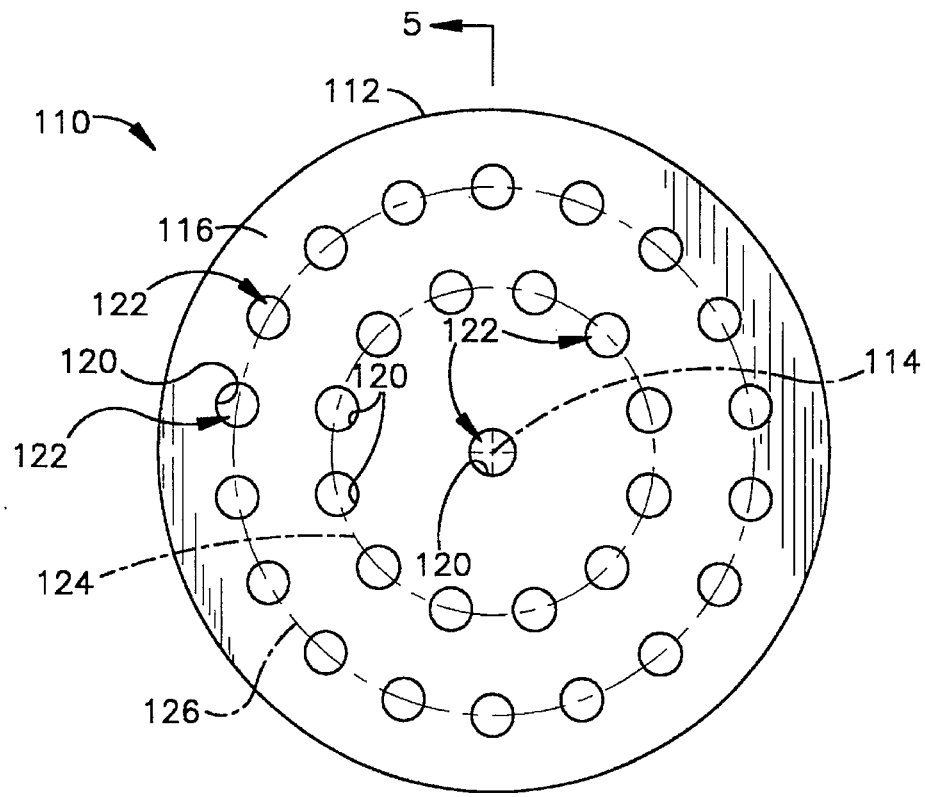
FIG. 4 is an enlarged view of a part shown in FIG. 2.
Figure 5:
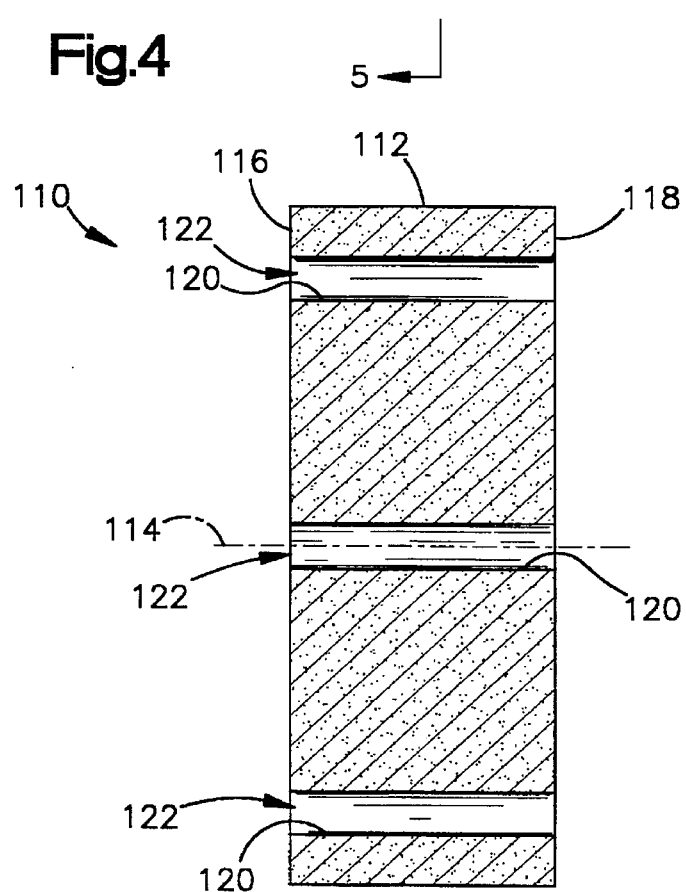
FIG. 5 is a view taken on line 5—5 of FIG. 4.

As an example of the different grains of gas generating material that may be used in the inflator 10, the configuration of a typical grain 110 is shown in detail in FIGS. 4 and 5. The grain 110 has a cylindrical outer surface 112 centered on an axis 114. The grain 110 further has first and second opposite side surfaces 116 and 118. Each of the opposite side surfaces 116 and 118 has a circular shape centered on the axis 114, and is generally perpendicular to the axis 114.

The grain 110 preferably has a plurality of cylindrical inner surfaces 120, each of which defines a respective cylindrical passage 122 extending axially through the grain 110. The number and arrangement of the cylindrical inner surfaces 120 may vary. As shown by way of example in FIGS. 4 and 5, one of the cylindrical inner surfaces 120 is centered on the axis 114, and the other cylindrical inner surfaces 120 are arranged in first and second circular arrays. The first circular array of cylindrical inner surfaces 120 extends circumferentially around the axis 114 on a first circular line 124. The first circular line 124 is centered on the axis 114. The second circular array of cylindrical inner surfaces 120 extends circumferentially around the axis 114 on a second circular line 126. The second circular line 126 also is centered on the axis 114, and is spaced radially outward from the first circular line 124. Moreover, each of the cylindrical inner surfaces 120 in the second circular array is at least partially offset circumferentially from each of the cylindrical inner surfaces 120 in the first circular array.

The body 60 of gas generating material further includes at least one atypical grain 128 (FIG. 2) of gas generating material. The atypical grain 128 differs from the typical grains 110 in that the atypical grain 128 has a substantially larger central passage 129, but is otherwise substantially the same as each of the typical grains 110.

Each of the grains 110 and 128 of gas generating material preferably has an ignition-enhancing coating formed of a pyrotechnic material. The pyrotechnic material of which the coatings are formed does not generate a significant amount of gas, but is more readily ignitable than the gas generating material of which the grains 110 and 128 are formed. The pyrotechnic material may have any suitable composition known in the art. Alternatively, the grains 110 and 128 of gas generating material could be free of such coatings.

A short, generally cylindrical spacer 130 (FIG. 2) is contained in the housing 12 at the axially inner end of the combustion chamber 64. The spacer 130 is seated closely against the end wall 16 of the housing 12, and spaces the body 60 of gas generating material axially from the end wall 16. The spacer 130 is preferably constructed in accordance with the invention set forth in copending U.S. patent application Ser. No. 08/358,788, filed Dec. 16, 1994, entitled AIR BAG INFLATOR AND METHOD OF ASSEMBLY, and assigned to TRW Vehicle Safety Systems Inc. As described in that copending application, an annular elastomeric seal 132 is stretched circumferentially and radially over the spacer 130. The seal 132 is compressively loaded between the surrounding surfaces of the adjoining parts of the inflator 10. As a result, the seal 132 fills the space through which a flow of gas from the combustion chamber 64 might otherwise leak past the filter 70 at the axially inner end of the housing 12.

A compartment 134 at the center of the spacer 130 contains a body 136 of auto-ignition material. The body 136 of auto-ignition material is held in the compartment 134 by a sheet 138 of metal foil or the like which is adhered to an inner surface 140 of the spacer 130. The auto-ignition material ignites and emits combustion products automatically when its temperature reaches a predetermined elevated level, and may have any suitable composition known in the art. The combustion products emitted from the body 136 of auto-ignition material rupture the sealing sheet 138 and move against the adjacent grain 110 of gas generating material in the combustion chamber 64. In this manner, the body 60 of gas generating material is ignited automatically when ambient conditions cause the temperature of the inflator 10 to reach the predetermined elevated level.

Although the preferred embodiments of the present invention include the spacer 130 and the seal 132, the axially inner end of the housing 12 could be sealed by an alternative structure, such as the structure disclosed in copending U.S. patent application Ser. No. 08/436,588, filed May 8, 1995, entitled AIR BAG INFLATOR AND METHOD OF ASSEMBLY, and assigned to TRW Vehicle Safety Systems Inc.

The closure cap 28 is preferably formed of aluminum, but may be formed of steel or any other suitable material known in the art. As shown separately in FIG. 6, the closure cap 28 has a body portion 150 centered on an axis 152. The body portion 150 of the closure cap 28 has axially inner and outer sides 154 and 156. A circumferentially extending peripheral surface 158 of the body portion 150 has an arcuate radial profile extending axially outward, and radially inward, from the inner side 154 to the outer side 156. The peripheral surface 158 thus has the contour of a dome which is centered on the axis 152. A plurality of recessed surfaces 160 at the outer side 156 of the body portion 150 define a corresponding plurality of cavities 162. The cavities 162 are spaced circumferentially from each other in a circular array centered on the axis 152.

A first cylindrical portion 164 of the closure cap 28 projects a short distance axially away from the outer side 156 of the body portion 150. An annular outer end surface 166 of the first cylindrical portion 164 defines the circular central opening 44 which is described above with reference to FIG. 1. A second cylindrical portion 170 of the closure cap 28 projects a short distance axially away from the inner side 154 of the body portion 150, and is spaced radially outward from the first cylindrical portion 164. The second cylindrical portion 170 has a cylindrical inner surface 172 centered on the axis 152.

The inner side 154 of the closure cap 28 includes first and second planar inner side surfaces 176 and 178, each of which lies in a respective plane perpendicular to the axis 152. The first inner side surface 176 has an annular shape, and extends radially inward from the second cylindrical portion 170 to a circular opening 179 centered on the axis 152. The second inner side surface 178 also has an annular shape, and extends radially outward from the second cylindrical portion 170 to the peripheral surface 158.

The closure cap 28 preferably has additional inner side surfaces 180 and 182 which together define a generally cylindrical compartment 184 containing a body 186 of auto-ignition material. Like the body 136 of auto-ignition material described above, the body 186 may be formed of any suitable auto-ignition material which ignites and emits combustion products automatically at a predetermined elevated temperature. The compartment 184 containing the body 186 of auto-ignition material is preferably sealed hermetically by a rupturable piece 188 of metal foil or the like which is adhered to the first planar inner side surface 176.

A passage 190 extends through the closure cap 28 between the openings 44 and 179. The passage 190 has three successive sections 192, 194, and 196, each of which has a cylindrical shape centered on the axis 152. The first section 192 of the passage 190 extends axially from the opening 179 to the second section 194. The length and diameter of the first section 192 are defined by a first cylindrical inner surface 198 of the body portion 150 of the closure cap 28. An end of the first section 192 is defined by a first annular inner surface 200 which extends radially inward from the first cylindrical inner surface 198.

The second section 194 of the passage 190 extends axially from the first section 192 to the third section 196. A second cylindrical inner surface 202 defines a shorter length, and a lesser diameter, for the second section 194, as compared to the first section 192. A second annular inner surface 204 extends radially inward from the second cylindrical inner surface 202, and defines an end of the second section 194 of the passage 190. The third section 196 of the passage 190 extends axially from the second section 194 to the opening 44. A third cylindrical inner surface 206 provides the third section 196 with the shortest length, and the smallest diameter, of the three sections 192, 194, and 196 of the passage 190.

As described briefly above with reference to FIG. 1, the closure cap 28 supports the igniter 36 on the axis 18 of the housing 12. As shown in greater detail in FIG. 2, the closure cap 28 also supports a retainer tube 220 in which the igniter casing 38 extends along the axis 18.

Figure 7:
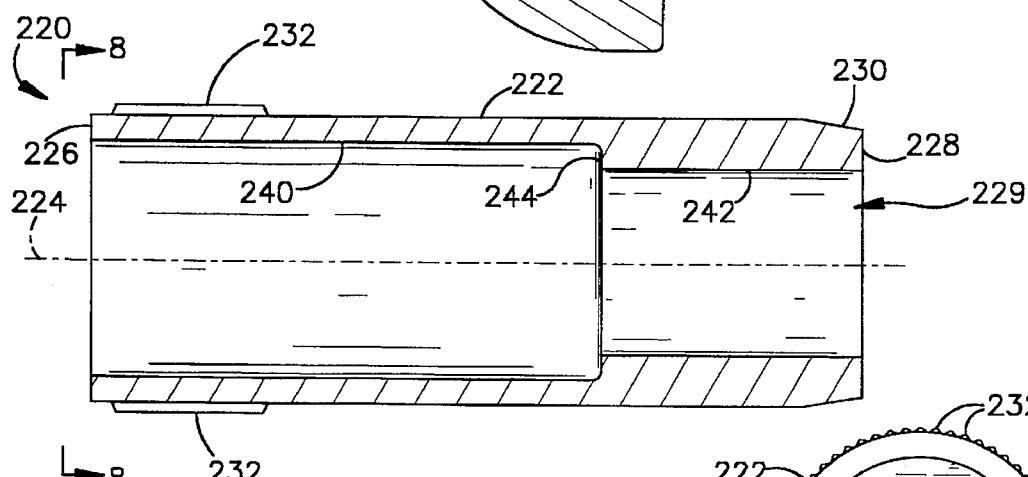
FIG. 7 is an enlarged view of another part shown in FIG. 2.
Figure 8:
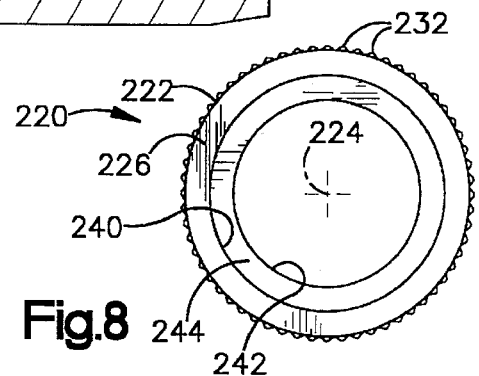
FIG. 8 is a view taken on line 8—8 of FIG. 7.

Like the closure cap 28, the retainer tube 220 is preferably formed of aluminum or steel. As shown separately in FIGS. 7 and 8, the retainer tube 220 has a cylindrical outer surface 222 centered on a longitudinal central axis 224. The retainer tube 220 further has first and second opposite end surfaces 226 and 228 with annular shapes centered on the axis 224. The second end surface 228 defines a circular opening 229. A chamfered edge surface 230 extends circumferentially around the axis 224 adjacent to the second end surface 228. A plurality of splines 232 are located near the first end surface 226. The splines 232 project radially outward from the cylindrical outer surface 222, and are elongated in directions parallel to the axis 224. The splines 232 all have the same size and shape, and are equally spaced a short distance from the first end surface 226. As shown in FIG. 8, the splines 232 are arranged in an array extending circumferentially entirely around the axis 224.

Figure 6:
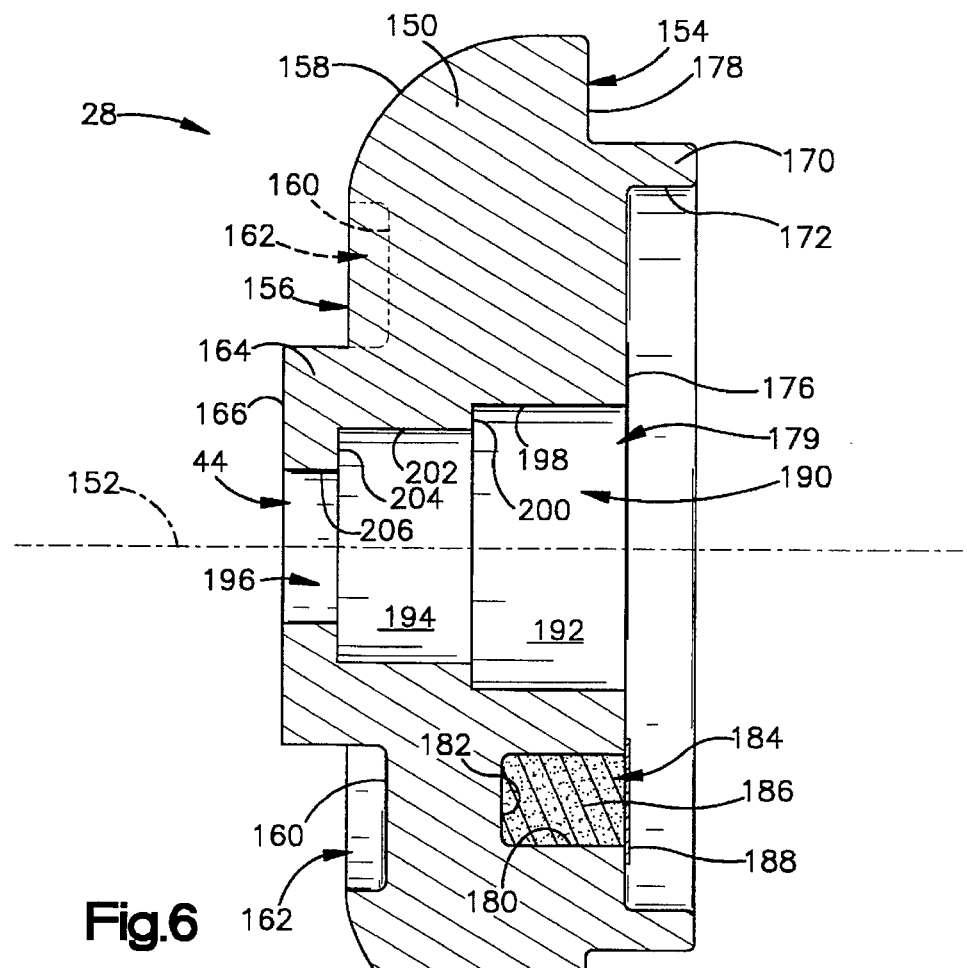
FIG. 6 is an enlarged view of a part shown in FIG. 2.

The retainer tube 220 further has first and second cylindrical inner surfaces 240 and 242 centered on the axis 224. The first cylindrical inner surface 240 has a diameter which is substantially equal to the diameter of the second cylindrical inner surface 202 of the closure cap 28 (FIG. 6). An annular inner surface 244 of the retainer tube 220 extends radially inward from the first cylindrical inner surface 240 to the smaller diameter second cylindrical inner surface 242.

Figure 9:
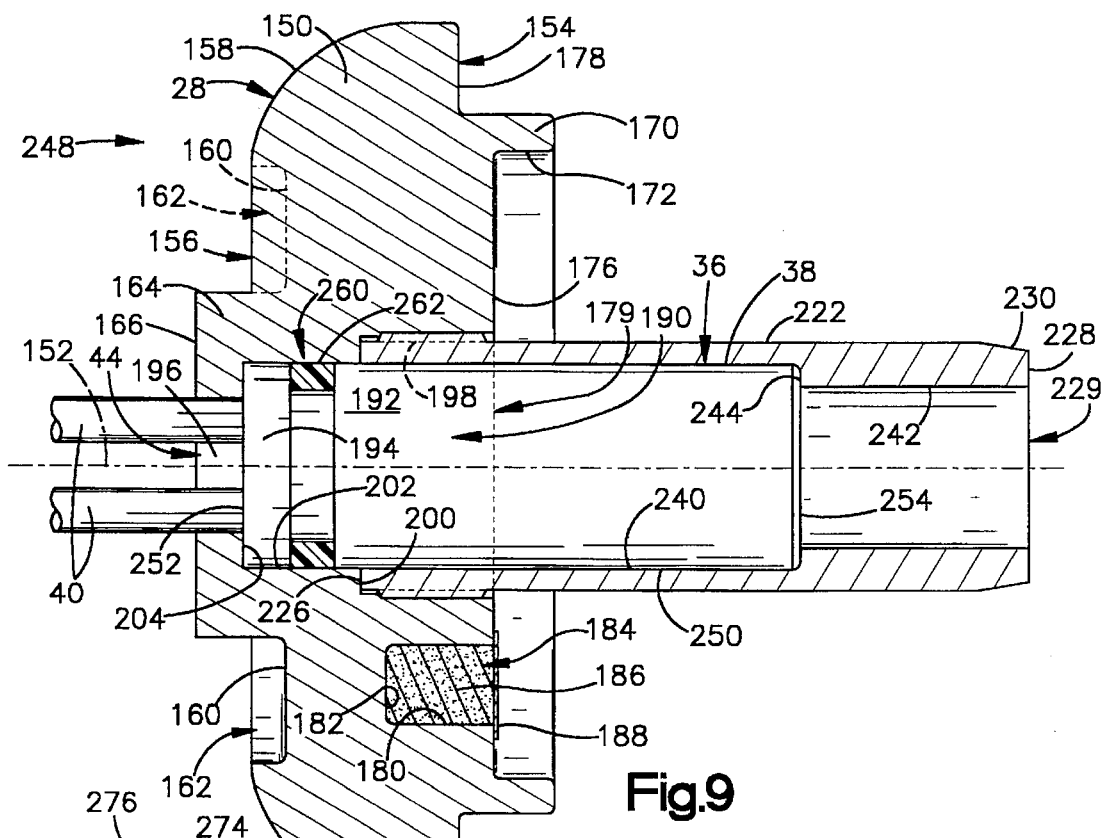
FIG. 9 is an enlarged view of a subassembly of parts shown in FIG. 2.

The closure cap 28, the retainer tube 220, and the igniter 36 are shown in FIG. 9 in an interconnected relationship with each other. When those parts of the inflator 10 are in the interconnected relationship of FIG. 9, they define a subassembly 248.

In the subassembly 248, the igniter casing 38 and the retainer tube 220 are received coaxially within the passage 190 in the closure cap 28. The casing 38 has an elongated cylindrical shape defined by a tubular body wall 250 and a pair of circular opposite end walls 252 and 254. The casing 38 is inserted in the passage 190 through the opening 179 (FIG. 6), and is moved axially through the passage 190 until the first end wall 252 of the casing 38 abuts the second annular inner surface 204 of the closure cap 28. The diameter of the body wall 250 of the casing 38 is equal to, or just slightly less than, the diameter of the second cylindrical inner surface 202 of the closure cap 28. Therefore, the casing 38 fits closely within the second section 194 of the passage 190, and projects axially away from the second section 194 through the first section 192 and the opening 179. The lead wires 40 project axially away from the casing 38 in the opposite direction through the third section 196 of the passage 190, and extend outward through the other opening 44. A notch 260 extending circumferentially around the casing 38 contains an elastomeric O-ring seal 262 which is compressively loaded radially between the casing 38 and the closure cap 28.

When the igniter 36 has been moved into the passage 190 in the closure cap 28 in the foregoing manner, the retainer tube 220 is moved into the passage 190 coaxially over the casing 38. As shown in FIG. 9, the inner diameter of the retainer tube 220 at the first cylindrical inner surface 240 is equal to, or just slightly greater than, the outer diameter of the casing 38 at the body wall 250. Therefore, the retainer tube 220 slides closely over the casing 38 as the retainer tube 220 is being moved into the passage 190 through the opening 179. The retainer tube 220 is movable into the passage 190 in this manner until the first annular end surface 226 of the retainer tube 220 abuts the first annular inner surface 200 of the closure cap 28. Preferably, the annular surface 244 inside the retainer tube 220 simultaneously abuts the second end wall 254 of the casing 38, but a small space may remain axially between those surfaces. The casing 38 is thus retained axially between the annular inner surface 244 of the retainer tube 220 and the oppositely facing, second annular inner surface 204 of the closure cap 28.

Importantly, the outer diameter of the retainer tube 220 at the cylindrical outer surface 222 is slightly less than the inner diameter of the closure cap 28 at the first cylindrical inner surface 198. Also, the outer diameter of the retainer tube 220 defined by the splines 232 is slightly greater than the inner diameter of the closure cap 28 at the first cylindrical inner surface 198. In accordance with this feature of the present invention, the splines 232 are moved forcefully against the first cylindrical inner surface 198 upon movement of the retainer tube 220 axially into the passage 190. Such forceful movement of the splines 232 against the first cylindrical inner surface 198 causes the splines 232 to cut into the material of the closure cap 28 so as to penetrate the body portion 150 of the closure cap 28 radially outward of the first cylindrical inner surface 198. The resistance offered by the material of the closure cap 28 simultaneously causes the splines 232 to become compressively deformed radially inward toward the cylindrical outer surface 222 of the retainer tube 220. The splines 232 are spaced from each other circumferentially so as to accommodate such radial compression. The amounts of cutting, penetration, and compression of the materials of the closure cap 28 and the splines 232 depends on the hardness of those materials, with the harder material yielding in a correspondingly lesser amount. A press fit is thus established which securely holds the retainer tube 222 in the passage 190 so that the retainer tube 222, in turn, securely holds the igniter 36 in the passage 190.

The subassembly 248 of FIG. 9 is closely received coaxially within the tubular wall 14 of the housing 12 (FIG. 2). As indicated in dot-dash lines in FIG. 2, the end portion 26 of the tubular wall 14 is initially cylindrical. When the closure cap 28 has been moved into the housing 12, the end portion 26 of the tubular wall 14 is deformed radially and axially inward over the closure cap 28. This process provides the end portion 26 of the tubular wall 14 with a dome-shaped contour closely matching that of the peripheral surface 158 of the closure cap 28 so that the end portion 26 closely overlies the peripheral surface 158. Preferably, the end portion 26 overlies the peripheral surface 158 in contact with a substantial area of the peripheral surface 158, and most preferably with an area that extends circumferentially entirely around the axis 18. Such deformation of the tubular wall 14 can be accomplished with any suitable technique known in the art, but is preferably accomplished in the manner described in the aforementioned copending U.S. patent application Ser. No. 08/327,281.

Figure 10:
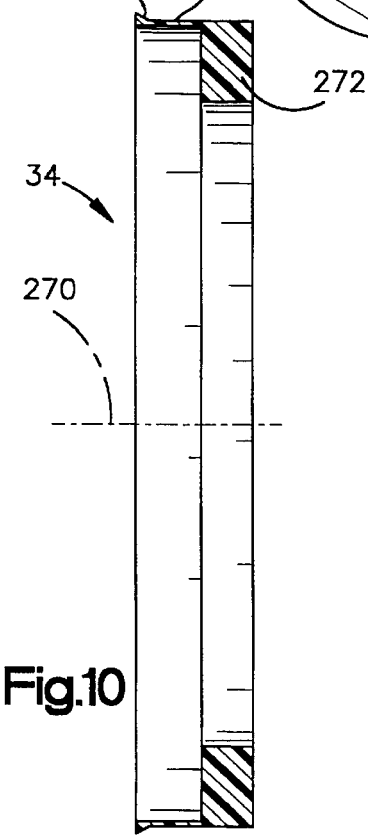
FIG. 10 is an enlarged view of another part shown in FIG. 2.

As described briefly above with reference to FIG. 2, the seal 34 is compressively engaged between the closure cap 28 and the end portion 26 of the tubular wall 14. As shown separately in FIG. 10, the seal 34 has a central axis 270, a body portion 272 with a rectangular cross section, and a lip portion 274 projecting axially from the body portion 272. The lip portion 274 of the seal 34 has a narrow radial thickness, as compared with the body portion 272, and includes a small flange 276 projecting radially outward at its free end.

The body portion 272 of the seal 34 is received coaxially over the second cylindrical portion 170 of the closure cap 28 (FIG. 2), and extends radially outward to the tubular wall 14 of the housing 12. The body portion 272 of the seal 34 further extends axially inward from the inner side surface 178 of the closure cap 28 to the tubular structure 62. The lip portion 274 of the seal 34 extends axially and radially between the dome-shaped peripheral surface 158 of the closure cap 28 and the overlying, dome-shaped end portion 26 of the tubular wall 14. When the end portion 26 of the tubular wall 14 is deformed radially and axially inward as described above, the body portion 272 and the lip portion 274 of the seal 34 are both compressively loaded between the surrounding surfaces of the adjoining parts of the inflator 10. As a result, the seal 34 fills the space through which gas might otherwise escape from the combustion chamber 64 and leak outward through the opening 32 in the closure cap 28.

A spring 280 also is contained in the housing 12, and is located axially between the closure cap 28 and the first grain 128 of gas generating material adjacent to the closure cap 28. The spring 280 in the first embodiment of the present invention is a coil spring formed of steel wire.

Figure 11:
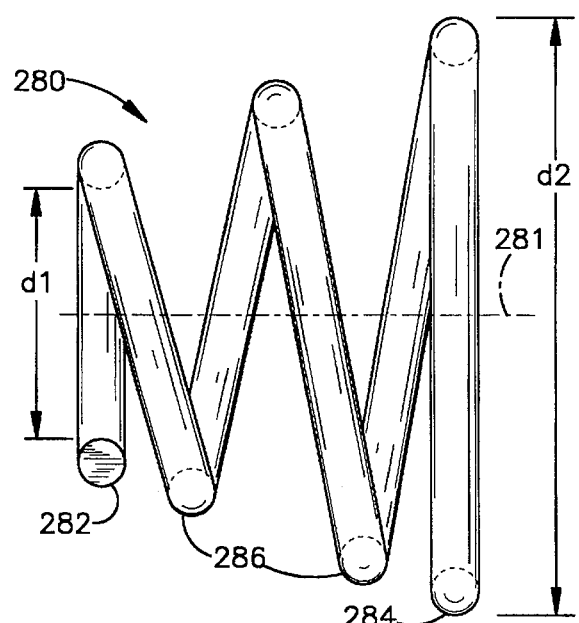
FIG. 11 is an enlarged view of still another part shown in FIG. 2.

As shown separately in FIG. 11, the spring 280 has a central axis 281, first and second circular coils 282 and 284 at its axially opposite ends, and a plurality of helical coils 286 extending along its length between the circular coils 282 and 284. When the spring 280 is in the unstressed condition of FIG. 11, the first circular coil 282 defines an inner diameter d1 of the spring 280. The inner diameter d1 is slightly less than the outer diameter of the retainer tube 220 (FIG. 9) at the cylindrical outer surface 222 of the retainer tube 220. The second circular coil 284 defines an outer diameter d2 of the spring 280. The outer diameter d2 is slightly less than the outer diameter of the first grain 128 (FIG. 2) of gas generating material.

As shown in FIG. 2, the first circular coil 282 of the spring 280 is received closely over the cylindrical outer surface 222 of the retainer tube 220. Since the unstressed inner diameter d1 (FIG. 11) of the first circular coil 282 is less than the diameter of the cylindrical outer surface 222, the first circular coil 282 is stressed and extended radially when it is being moved axially onto the cylindrical outer surface 222. The chamfered edge surface 230 of the retainer tube 220 helps to extend the first circular coil 282 to the diameter of the cylindrical outer surface 222. As a result, the first circular coil 282 exerts a spring force radially inward against the cylindrical outer surface 222 to establish a tight fit which holds the spring 280 securely on the retainer tube 220. The spring 280 is connected with the subassembly 248 (FIG. 9) in this manner before the subassembly 248 is placed within the tubular wall 14 of the housing 12.

When the tubular wall 14 is deformed axially and radially inward against the closure cap 28, as described above, the first circular coil 282 on the spring 280 is pressed axially against the first inner side surface 176 of the closure cap 28. The second circular coil 284 on the spring 280 is pressed axially against the first grain 128 of gas generating material. The spring 280 is thus compressed axially between the closure cap 28 and the body 60 of gas generating material so as to exert a bias which urges the body 60 axially against the spacer 130, and which holds the separate grains 128 and 110 together firmly enough to keep them from moving within the housing 12.

The igniter 36 is included in an electrical circuit 290, as shown schematically in FIG. 12, when the inflator 10 is installed in a vehicle. The electrical circuit 290 further includes a power source 292, which is preferably the vehicle battery and/or a capacitor, and a normally open switch 294. As known in the art, the switch 294 is part of a sensor 296 which senses a vehicle condition indicating the occurrence of a vehicle collision. The collision-indicating condition may comprise, for example, sudden vehicle deceleration that is caused by a collision. If the collision-indicating condition is above a predetermined threshold level, it indicates the occurrence of a collision having a level of severity for which inflation of the inflatable device is desired for protection of a vehicle occupant. The switch 294 closes when the sensor 296 senses such a collision-indicating condition.

When the switch 294 in the circuit 290 is closed, electric current is directed through the igniter 36 between the lead wires 40 (FIG. 2). The pyrotechnic material in the casing 38 is then ignited and, as described above, generates combustion products which are spewed into the housing 12 to ignite the body 60 of gas generating material in the housing 12. Specifically, the combustion products rupture the second end wall 254 of the casing 38 and move rapidly outward through the retainer tube 220 from the casing 38 to the opening 229. The combustion products emerging from the opening 229 move against the first grains 128 and 110 of gas generating material adjacent to the subassembly 248 to ignite the first grains 128 and 110.

When the first grains 128 and 110 of gas generating material are ignited, they rapidly generate a large volume of inflation gas. They also produce and emit additional combustion products including heat and hot particles. Some of those combustion products move into contact with next adjacent grain 110 of gas generating material. As a result, the next adjacent grain 110 of gas generating material also is ignited and, in turn, emits additional combustion products.

This process continues along the length of the elongated body 60 of gas generating material as all of the grains 110 are ignited successively. The ignitable surface areas provided by the cylindrical inner surfaces 120, and the fluid communication provided by the passages 122, promote rapid ignition of the grains 110 in this manner.

The combustion chamber 64 is fully closed and sealed at its axially opposite ends by the closure cap 28, the spacer 130, and the elastomeric seals 34, 262, and 132. This constrains the gas to flow outward from the combustion chamber 64 only through the cylindrical screen 66 (FIG. 2). The gas subsequently flows radially outward through the filter 70. When the filtered gas emerges from the outermost filter layer 72, it continues to flow radially outward toward the tubular housing wall 14 through the gap 90 defined by the support member 80. The sheet 102 of rupturable pressure controlling material initially contains the gas within the housing 12. When the pressure of the gas acting radially outward against the sheet 102 reaches a predetermined elevated level, it ruptures the circular portions 104 of the sheet 102 which extend across the inner ends of the outlet openings 46. The gas then emerges from the inflator 10 through the outlet openings 46.

Figure 14:
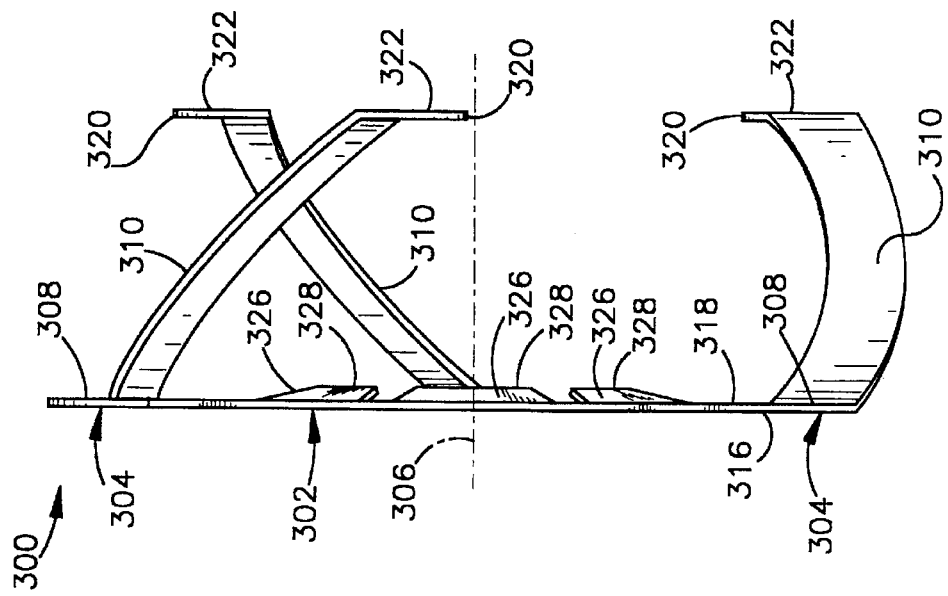
FIG. 14 is a view taken on line 14—14 of FIG. 13.
Figure 13:
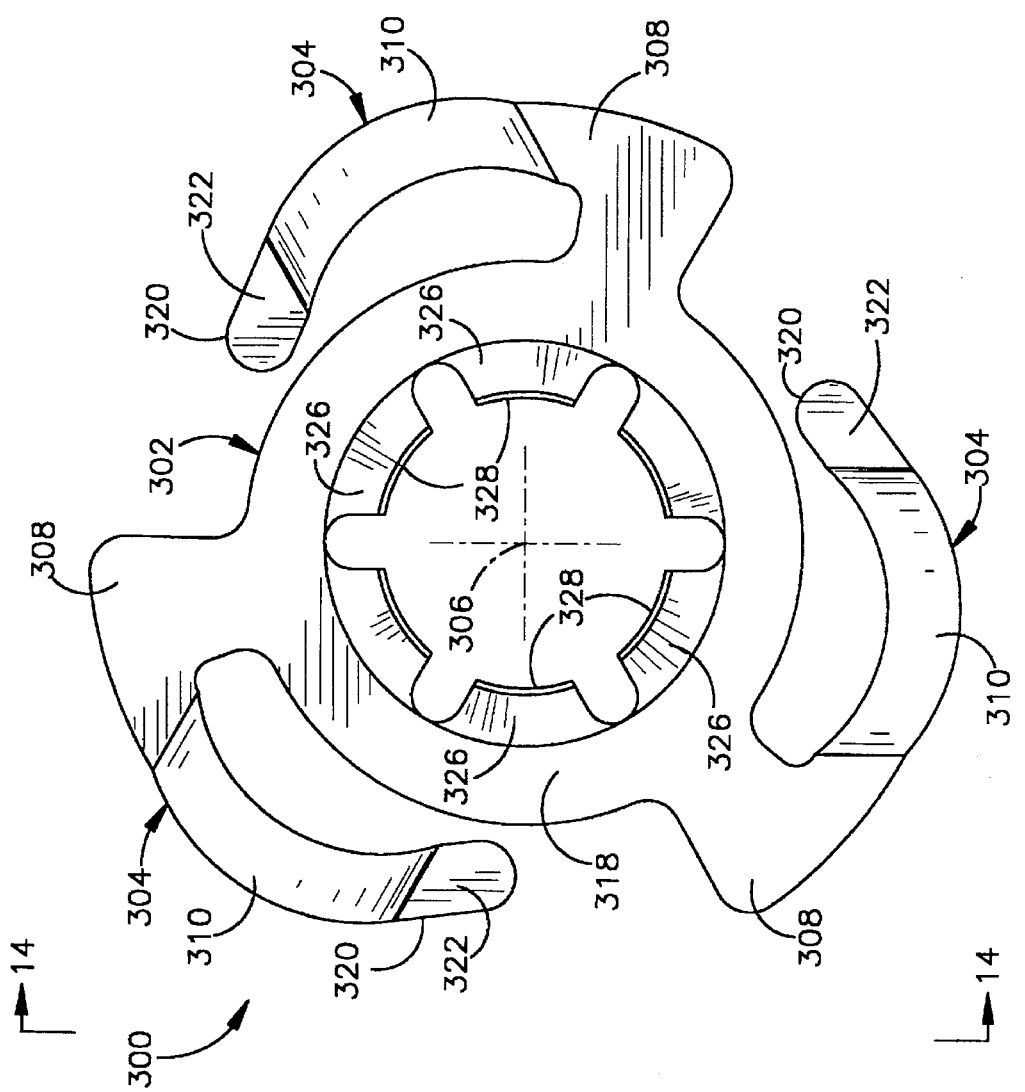
FIG. 13 is a view of a part of a second embodiment of the present invention.

In a second embodiment of the present invention, the inflator 10 includes an alternative spring 300 in place of the coil spring 280 described above with reference to the first embodiment. As shown in FIGS. 13 and 14, the alternative spring 300 is a leaf spring with a central portion 302 and a plurality of spring arms 304 projecting away from the central portion 302. The leaf spring 300 is preferably formed of a single piece of stamped spring steel.

The central portion 302 of the leaf spring 300 has an annular shape centered on an axis 306. The spring arms 304 all have the same size and shape, with each spring arm 304 having a base portion 308 and a flexible portion 310. The base portions 308 of the spring arms 304 project radially outward from the central portion 302 of the spring 300 at locations that are equally spaced from each other about the axis 306. As best shown in FIG. 14, the base portions 308 of the spring arms 304 and the annular central portion 302 of the spring 300 together define a pair of parallel, planar opposite side surfaces 316 and 318 of the spring 300 which face oppositely away from each other in directions parallel to the axis 306.

The flexible portions 310 of the spring arms 304 project from their respective base portions 308 in directions extending somewhat circumferentially around the axis 306, and also in directions extending inward along the axis 306, i.e., in directions extending from left to right as viewed in FIG. 14. Each flexible portion 310 has a tab 320 at its distal or axially inner end. The tabs 320 have inner side surfaces 322 in a common plane perpendicular to the axis 306.

The leaf spring 300 further includes a plurality of barbs 326 projecting radially and axially inward from the base portion 302. Each barb 326 has a radially inner edge 328 defined by a corresponding corner of the stamped piece of spring steel. The edges 328 of the barbs 326 have a common circular contour with a radius that is slightly less than the radius of the cylindrical outer surface 222 of the retainer tube 220 (FIG. 9).

Figure 15:
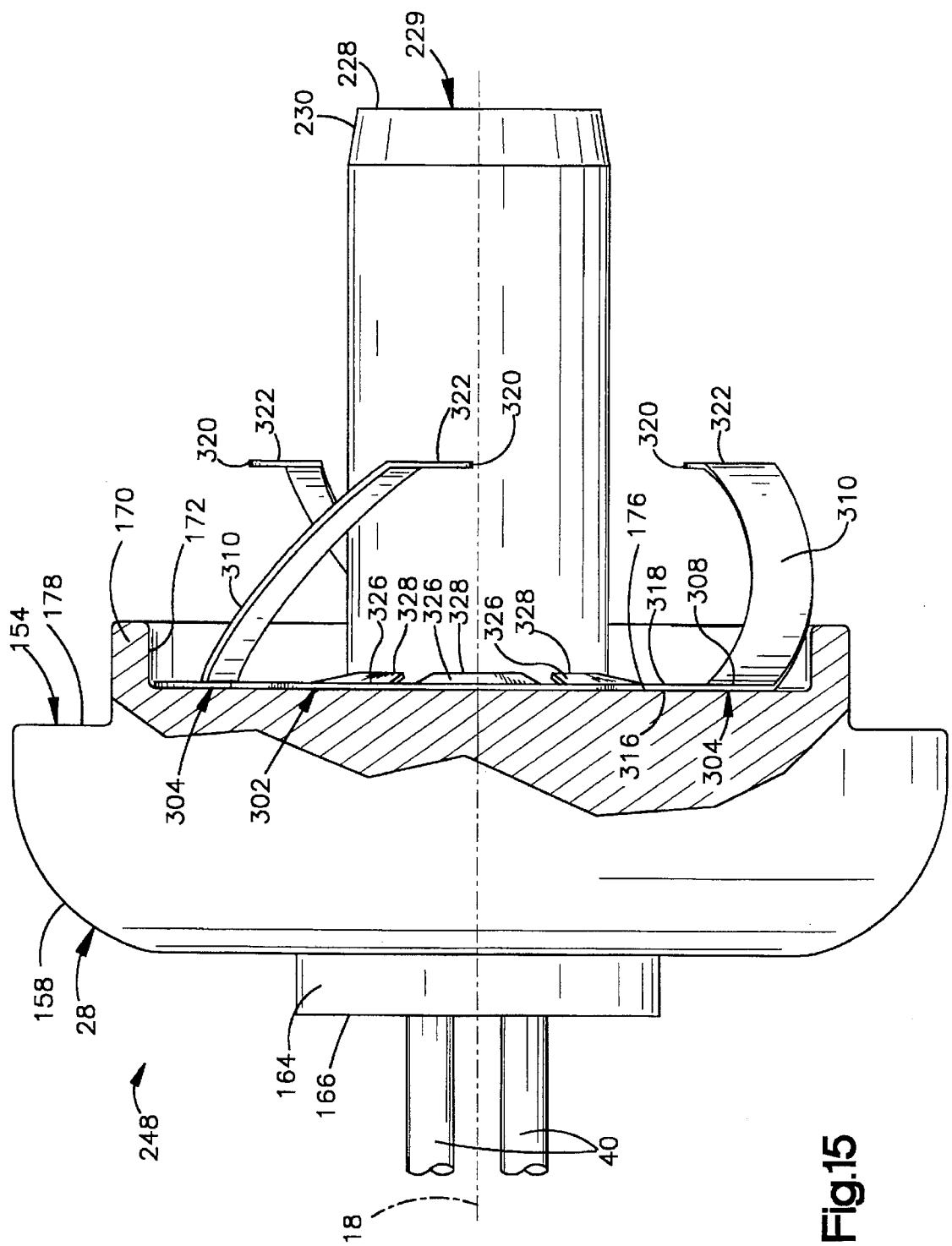
FIG. 15 is a view showing the part of FIG. 13 in an interconnected relationship with other parts of the second embodiment.

As shown in FIG. 15, the leaf spring 300 is installed coaxially over the retainer tube 220 in the subassembly 248 as a replacement for the coil spring 280. First, the annular central portion 302 of the leaf spring 300 is moved over the retainer tube 220 toward the closure cap 28. The barbs 326, which project radially inward from the annular central portion 302, are flexed radially outward a slight amount upon being moved axially against the chamfered edge surface 230 of the retainer tube 220. The barbs 326 subsequently exert a spring force radially inward against the cylindrical outer surface 222 of the retainer tube 220 upon being moved over the cylindrical outer surface 222. The edges 328 of the barbs 326 permit the barbs 326 to slide along the cylindrical outer surface 222 in a direction extending axially toward the closure cap 28 upon further movement of the leaf spring 300 toward the position in which it is shown in FIG. 15. However, the edges 328 of the barbs 326 cut into the metal material of the retainer tube 220 at the cylindrical outer surface 222 to block movement of the leaf spring 300 in the axially opposite direction.

When the leaf spring 300 has been connected with the subassembly 248 in the foregoing manner, the leaf spring 300 and the subassembly 248 are inserted together into the housing 12 (FIG. 1) through the open end portion 26 of the tubular housing wall 14. The tabs 320 at the inner ends of the spring arms 304 are then placed against the first grain 128 (FIG. 2) of gas generating material. When the end portion 26 of the tubular wall 14 is deformed axially and radially inward against the closure cap 28, as described above, the leaf spring 300 becomes compressed axially between the closure cap 28 and the first grain 128 of gas generating material. The first side surface 316 of the leaf spring 300 is pressed axially against the first inner side surface 176 of the closure cap 28. Importantly, the flexible portions 310 of the spring arms 304 are deflected axially so as to exert a spring force against the body 60 of gas generating material which urges the body 60 axially against the spacer 130 at the other end of the housing 12.

From the above description of the invention, those skilled in the art will perceive improvements, changes and modifications. For example, the preferred embodiments of the present invention include a closure cap 28 and a retainer tube 222 which together support an igniter 36. However, it is known in the art to support an igniter in a tubular structure that is constructed in one piece with a closure cap. Such a tubular structure projects axially toward an adjacent body of ignitable gas generating material, and has a cylindrical outer surface substantially similar to the cylindrical outer surface 222 of the retainer tube 220 described above. A spring constructed in accordance with the present invention could engage such a cylindrical outer surface of a closure cap for connection with the closure cap, rather than engaging the cylindrical outer surface 222 of the retainer tube 220. Such improvements, changes and modifications within the skill of the art are intended to be covered by the appended claims.

Having described the invention, the following is claimed:

1. Apparatus comprising:
    a housing with a longitudinal axis, said housing containing a body of ignitable gas generating material having a cylindrical shape with a circular end surface centered on said axis;
    an igniter with a cylindrical casing;
    an elongated retainer tube projecting longitudinally over said casing, said retainer tube having a cylindrical outer surface centered on said axis; and
    a spring having a first end portion with a first diameter and a second end portion with a second, greater diameter;
    said first end portion of said spring engaging said cylindrical outer surface of said retainer tube in a tight fit which connects said spring to said retainer tube;
    said second end portion of said spring being pressed axially against said circular end surface of said body of gas generating material radially outward of said retainer tube.

2. Apparatus as defined in claim 1 wherein said spring is a wire coil spring with a conical shape tapered radially outward from said first end portion to said second end portion.

3. Apparatus as defined in claim 1 wherein said spring has an annular part and a plurality of flexible spring arms projecting axially and radially from said annular part, said annular part defining said first diameter at said first end portion of said spring, said spring arms having distal end portions which are spaced from each other circumferentially about said axis and which define said second, greater diameter at said second end portion of said spring.

4. Apparatus as defined in claim 3 wherein said annular part of said spring has a flexible barb which is pressed radially inward against said cylindrical outer surface of said retainer tube and which cuts into said retainer tube at said cylindrical outer surface to block movement of said spring axially over said cylindrical outer surface.

5. Apparatus as defined in claim 3 wherein said distal end portions of said spring arms have planar inner side surfaces in a common plane perpendicular to said axis, said inner side surfaces being pressed axially against said circular end surface of said body of gas generating material.

6. Apparatus comprising:

a housing containing a body of ignitable gas generating material;

an igniter;

support means for supporting said igniter in a position for igniting said body of gas generating material; and a leaf spring biasing said body of gas generating material away from said support means, said leaf spring having means for engaging said support means so as to connect said leaf spring to said support means;

said support means having a cylindrical surface centered on an axis, said means for engaging said support means comprising a barb on said leaf spring which engages said cylindrical surface so as to permit sliding movement of said spring over said cylindrical surface in a first direction and to block sliding movement of said spring over said cylindrical surface in a second direction opposite to said first direction.

7. Apparatus as defined in claim 6 wherein said first and second directions are parallel to said axis.

* * * * *